United States Patent [19]
Scott et al.

[11] Patent Number: 5,942,585
[45] Date of Patent: Aug. 24, 1999

[54] POLYCARBONATE AND POLYESTER BLENDS

[75] Inventors: Christopher E. Scott, Cambridge, Mass.; Mark E. Stewart, Kingsport, Tenn.; Donald S. Wilmoth, Knoxville, Tenn.; John C. Morris; James R. Bradley, both of Kingsport, Tenn.

[73] Assignee: Eastman Chemical Company, Kingsport, Tenn.

[21] Appl. No.: 08/996,458

[22] Filed: Dec. 23, 1997

Related U.S. Application Data

[60] Provisional application No. 60/034,153, Dec. 28, 1996.
[51] Int. Cl.$^6$ ............................. C08L 69/00; C08L 67/02
[52] U.S. Cl. ................................................. 525/439
[58] Field of Search ............................................. 525/439

[56] References Cited

U.S. PATENT DOCUMENTS

| | | | |
|---|---|---|---|
| 3,301,777 | 1/1967 | Leonard | 204/290 |
| 3,313,777 | 4/1967 | Elam et al. | 260/47 |
| 3,772,405 | 11/1973 | Hamb | 260/860 |
| 4,188,314 | 2/1980 | Fox et al. | 260/37 PC |
| 4,263,364 | 4/1981 | Seymour et al. | 428/287 |
| 4,267,096 | 5/1981 | Bussink et al. | 260/40 R |
| 4,391,954 | 7/1983 | Scott | 525/439 |
| 4,585,854 | 4/1986 | Tung et al. | 528/295 |
| 4,619,976 | 10/1986 | Morris et al. | 525/439 |
| 4,645,802 | 2/1987 | Jackson, Jr. et al. | 525/419 |
| 4,786,692 | 11/1988 | Allen et al. | 525/439 |
| 5,034,457 | 7/1991 | Serini et al. | 525/67 |
| 5,104,723 | 4/1992 | Freitag et al. | 428/220 |
| 5,137,970 | 8/1992 | Eckel et al. | 525/67 |
| 5,145,911 | 9/1992 | Eckel et al. | 525/67 |
| 5,310,793 | 5/1994 | Freitag . | |
| 5,342,819 | 8/1994 | Takiguchi et al. . | |
| 5,461,120 | 10/1995 | Mason et al. . | |
| 5,498,668 | 3/1996 | Scott . | |
| 5,508,344 | 4/1996 | Mason et al. . | |

OTHER PUBLICATIONS

Coover, Jr. et al., *Copolyester Molding Composition*, United States Patent Office, Defensive Publication T875,010, published Jun. 9, 1970 (875 O.G. 842).

*Primary Examiner*—David Buttner
*Attorney, Agent, or Firm*—Betty J. Boshears; Harry J. Gwinnell

[57] ABSTRACT

Disclosed are clear blends comprising:

(A) from 1 to 99 percent by weight of a polycarbonate comprising a diol component comprising from 5 to 100 mol percent units of a diphenol or mixture of diphenols having the formula

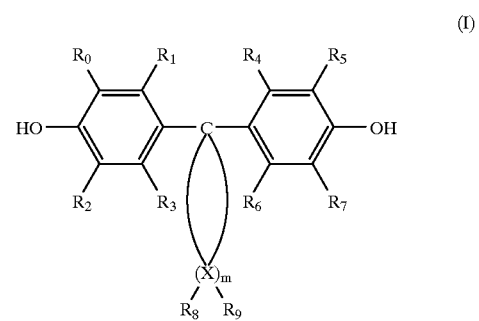

(B) from 1 to 99 percent by weight of a polyester comprising (a) a dicarboxylic acid component comprising from 80 to 100 mol percent 1,4-cyclohexane-dicarboxylic acid units; and from 0 to about 20 mol percent modifying dicarboxylic acid units having from 2 to 20 carbons, and (b) a glycol component comprising from 10 to 75 mol percent 2,2,4,4-tetramethyl-1,3-cyclobutanediol units, from 25 to 90 mol percent 1,4-cyclohexanedimethanol units, and from 0 to 10 mol percent modifying glycol units having 2 to 16 carbons, wherein the total units of said polyester is equal to 200 mol percent; wherein said blend is clear and the total weight percent of said polycarbonate (A) and said polyester (B) is equal to 100 weight percent.

23 Claims, No Drawings

POLYCARBONATE AND POLYESTER BLENDS

CROSS-REFERENCE TO RELATED APPLICATIONS

This application claims priority to U.S. provisional application Ser. No. 60/034,153, filed Dec. 28, 1996, and the application Ser. No. 60/034,153 is herein incorporated by this reference in its entirety.

FIELD OF THE INVENTION

The present invention relates to clear blends of polycarbonates and polyesters. More particularly, the present invention relates to clear blends of polycarbonates of dihydroxydiphenyl cycloalkanes and optionally bisphenol A with polyesters from 1,4-cyclohexanedicarboxylic acid (trans, cis, or mixtures thereof), 1,4-cyclohexanedimethanol and 2,2,4,4-tetramethyl-1,3-cyclobutanediol.

BACKGROUND OF THE INVENTION

The polycarbonate of 4,4'-isopropylidenediphenol (bisphenol A polycarbonate) is a well known engineering molding plastic. Bisphenol A polycarbonate is a clear high-performance plastic having good physical properties such as dimensional stability, high heat resistance, and good impact strength. Although bisphenol A polycarbonate has many good physical properties, its relatively high melt viscosity leads to poor melt processability and the polycarbonate exhibits poor chemical resistance.

Blends of the polycarbonates of bisphenol A and various dihydroxydiphenyl cycloalkanes have been used in making plastic films, molded articles, and extruded articles. These polycarbonate blends are especially useful in the performance plastics industry because they tend to have good heat resistance, high melt viscosities suitable for injection molding and extrusion, toughness, and good chemical resistance.

U.S. Pat. No. 5,034,457 discloses blends of dihydroxydiphenyl cycloalkane polycarbonates with a mixture of amorphous thermoplastics, partly crystalline thermoplastics, and rubber used for injection molding. U.S. Pat. No. 5,104,723 discloses blends of dihydroxydiphenyl cycloalkane polycarbonates with amorphous thermoplastics, partially crystalline thermoplastics, and elastomers for the production of films.

However, there has been no disclosure of miscible blends of dihydroxydiphenyl cycloalkane polycarbonates with other materials. Immiscible blend compositions are inadequate for many uses because they are opaque, and generally result in an unacceptable reduction in impact strength and tensile strength.

Clear, miscible blends of any two polymers are rare. The term "miscible" refers to blends that are a mixture on a molecular level wherein intimate polymer-polymer interaction is achieved. Miscible blends are clear, not translucent or opaque. In addition, differential scanning calorimetry testing detects only a single glass transition temperature (Tg) for miscible blends composed of two or more components.

There have been very few clear polycarbonate/polyester blends developed. U.S. Pat. Nos. 4,619,976 and 4,645,802 disclose clear blends based on bisphenol A polycarbonate with polyesters of poly(1,4-tetramethylene terephthalate), poly(1,4-cyclohexylenedimethylene terephthalate) and selected copolyesters and copoly(ester-imides) of poly(1,4-cyclohexylenedimethylene terephthalate). U.S. Pat. No. 4,786,692 discloses clear blends of bisphenol A polycarbonate and polyesters of terephthalic acid, isophthalic acid, ethylene glycol, and 1,4-cyclohexanedimethanol. U.S. Pat. Nos. 4,188,314 and 4,391,954 disclose clear blends of bisphenol A polycarbonate with poly(1,4-cyclohexylenedimethylene terephthalate-co-isophthalate). These polyester blends do have improved chemical resistance and melt processability, when compared to unblended bisphenol A polycarbonate. However, the good heat resistance and impact strength of bisphenol A polycarbonate blends based on these compositions is reduced significantly.

In light of the above, it would be desirable to be able to form clear polyester blends of dihydroxydiphenyl cycloalkane polycarbonates having good melt processability suitable for injection molding. Such blend would be especially suitable for the manufacture of clear molded articles, fibers, sheeting, and film.

SUMMARY OF THE INVENTION

The blend composition according to the present invention comprises:

(A) about 1 to 99 percent by weight of a polycarbonate comprising a diol component comprising about 5 to 100 mol percent units of a diphenol or mixture of diphenols having the formula

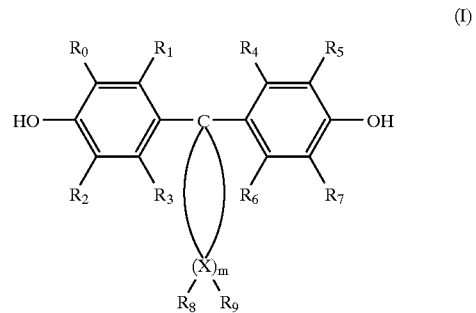

(I)

wherein $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl, X represents carbon, m is an integer of from 4 to 7, and and $R_8$ and $R_9$ are independently selected for each X and independently selected of each other from the group consisting of hydrogen and $C_1$–$C_3$ alkyl;

0 to about 95 mol percent 4,4'-isopropylidenediphenol units, and about 0 to about 10 mol percent modifying glycol units having 2 to 16 carbons, wherein the total mol percent of diol units is equal to 100 mol percent; and (B) about 1 to 99 percent by weight of a polyester comprising (a) a dicarboxylic acid component comprising about 80 to 100 mol percent 1,4-cyclohexanedicarboxylic acid units, and 0 to about 20 mol percent modifying dicarboxylic acid units having about 2 to 20 carbons, wherein the total mol percent of dicarboxylic acid units is equal to 100 mol percent; and (b) a glycol component comprising about 10 to 75 mol percent 2,2,4,4-tetramethyl-1,3-cyclobutanediol units, about 25 to 90 mol percent 1,4-cyclohexanedimethanol units, and 0 to about 10 mol percent modifying glycol units having 2 to 16 carbons, wherein the total mol percent of glycol units is equal to 100 mol percent;

wherein the total units of said polyester is equal to 200 mol percent; wherein said blend is clear and the total weight percent of said polycarbonate (A) and said polyester (B) is equal to 100 weight percent.

The invention also covers a method of using the blend compositions to produce a clear article of manufacture. The method of using the clear blend composition to produce a clear article of manufacture comprises the steps of:

(a) blending polycarbonate (A) and polyester (B);

(b) before, during or after the blending, melting polycarbonate (A) and polyester (B) to form, after the blending and melting, a melt blend;

(c) then cooling the melt blend to form a clear blend composition

DETAILED DESCRIPTION OF THE INVENTION

The present invention may be understood more readily by reference to the following detailed description of preferred embodiments of the invention and the Examples included therein.

Before the present compositions of matter are disclosed and described, it is to be understood that this invention is not limited to specific synthetic methods or to particular formulation, as such may, of course, vary. It is also to be understood that the terminology used herein is for the purpose of describing particular embodiments only and is not intended to be limiting.

In this specification, the singular forms "a", "an" and "the" include plural referents unless the context clearly dictates otherwise.

The applicants were very surprised to discover clear blends of the polycarbonate of the diphenol of formula (I) with particular polyesters from 1,4-cyclohexanedicarboxylic acid, isophthalic acid, 2,2,4,4-tetramethyl-1,3-cyclobutanediol, and 1,4-cyclohexanedimethanol. The applicants were also surprised to discover clear blends of copolycarbonates of the diphenol of formula (I) and bisphenol A with particular polyesters from 1,4-cyclohexanedicarboxylic acid, isophthalic acid, 2,2,4,4-tetramethyl-1,3-cyclobutanediol, and 1,4-cyclohexanedimethanol.

This discovery was surprising since there are no teachings of clear polycarbonate/polyester blends based on the polycarbonate of a dihydroxydiphenyl cycloalkane. This discovery was particularly surprising since there are no teachings of a polycarbonate/polyester blend having a 2,2,4,4-tetramethyl-1,3-cyclobutanediol based glycol component in the polyester. Nor are there any teachings suggesting that such a blend may be clear. Although U.S. Pat. No. 3,301,777 discloses polyesters containing 2,2,4,4-tetramethyl-1,3-cyclobutanediol, there is no suggestion of the benefit of blending a 2,2,4,4-tetramethyl-1,3-cyclobutanediol based polyester with a polycarbonate.

It was further surprising to find that a clear polycarbonate blend is formed with a polyester of 1,4-cyclohexanedimethanol and a substantial amount of 2,2,4,4-tetramethyl-1,3-cyclobutanediol. U.S. Pat. No. 4,391,954 discloses that a bisphenol A polycarbonate blend is likely to be compatible when the glycol component of the polyester is composed of 1,4-cyclohexane dimethanol units, with only a minor amount of other glycol units present. However, the applicants have found that the blends of the present invention are clear when the polyester has a combination of 0 to 100 mol percent 1,4-cyclohexane- dimethanol and 0 to 100 mol percent 2,2,4,4-tetramethyl-1,3-cyclobutanediol forming the glycol component. This was found to be true even when the diol component of the polycarbonate portion of the blend contains, besides bisphenol A units, up to 100 mol percent units of the dihydroxydiphenyl cycloalkane of formula (I).

It was utmost unexpected that a polyester having a dicarboxylic acid component of 1,4-cyclohexane-dicarboxylic acid units, instead of units of the much more typically favored aromatic para oriented dicarboxylic acids such as those listed in U.S. Pat. No. 4,391,954, would provide a clear blend which retains much of the mechanical and physical properties of the polycarbonate.

There have been no previous suggestions that combining 1,4-cyclohexanedimethanol and 2,2,4,4-tetramethyl- 1,3-cyclobutanediol in a polyester would form a clear polycarbonate blend. For example, see U.S. Pat. No. 3,313,777 and Defensive Publication T-875,010 for disclosure of polyesters based on 1,4-cyclohexane dimethanol and 2,2,4,4-tetramethyl-1,3-cyclobutanediol.

The term "polycarbonate" is herein defined as the condensation product of a carbonate source and a diol source, having a carbonate component containing 100 mol percent carbonate units and a diol component containing 100 mol percent diol units, for a total of 200 mol percent monomeric units. The term "diol" as used herein, includes both aliphatic and aromatic compounds having two hydroxyl groups, while the term "glycol" refers to aliphatic and aromatic/aliphatic compounds having two hydroxyl groups.

The polycarbonate portion of the blend of the present invention is based upon the polycarbonate of the diphenol or mixture of diphenols of formula (I).

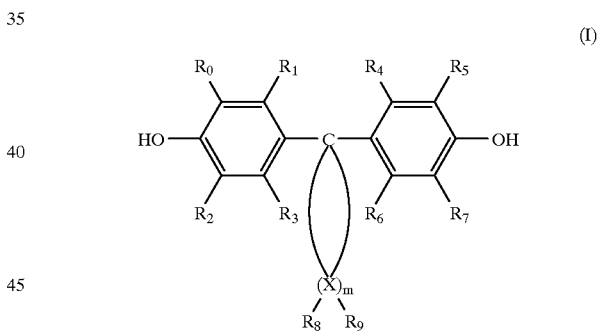

in which $R_0$, $R_1$, $R_2$, $R_3$, $R_4$, $R_5$, $R_6$, and $R_7$ independently of one another are hydrogen, halogen, $C_1$–$C_8$ alkyl, $C_5$–$C_{12}$ cycloalkyl, $C_5$–$C_{12}$ aryl or $C_6$–$C_{12}$ aralkyl, X represents carbon, m is an integer from 4 to 7, and $R_8$ and $R_9$ are, independently for each X and independently of one another, hydrogen or $C_1$–$C_8$ alkyl.

Suitable halogen substituents of the diphenol of formula (I) include, but are not limited to, chlorine, bromine and fluorine. Examples of suitable alkyl substituent groups include, but are not limited to, methyl, ethyl, propyl, isopropyl, t-butyl, pentyl, hexyl, heptyl and octyl. Examples of suitable cycloalkyl substituent groups include, but are not limited to, the cyclohexyl, and the methyl-, ethyl-, propyl-, and t-butyl-cyclohexyl moieties. Examples of suitable aryl substituent groups include, but are not limited to, phenyl, benzyl, substituted alkyl phenyl, substituted halophenyl and naphthyl.

The preferred diphenol of formula (I) is a cyclohexyl diphenol shown by formula (II) below, wherein $R_0$ through $R_7$ are selected as described above. The most preferred diphenol of formula (I) is the condensation product of isophorone and phenol known as 3,3,5-trimethylcyclohexane bisphenol, the cyclohexyl diphenol of formula (II) in which $R_0$ through $R_7$ are substituted with hydrogen.

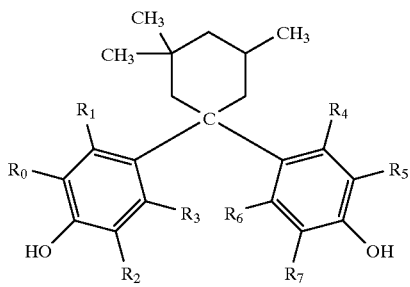

(II)

The polycarbonate portion of the blend of the present invention is preferably a copolycarbonate of the diphenol of formula (I) and 4,4'-isopropylidenediphenol, commonly known as bisphenol A, shown below in formula (III).

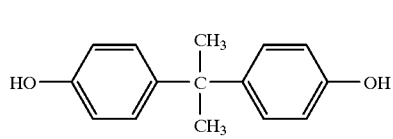

(III)

Suitable polycarbonates are those having a diol component containing about 5 to 100 mol percent formula (I) diphenol units and 0 to about 95 mol percent bisphenol A units, preferably about 10 to 90 mol percent formula (I) diphenol units and about 10 to 90 mol percent bisphenol A units, more preferably about 20 to 50 mol percent formula (I) diphenol units and about 50 to 80 mol percent bisphenol A units, most preferably about 30 to 35 mol percent formula (I) diphenol units and about 65 to 70 mol percent bisphenol A units. One especially suitable commercial copolycarbonate is APEC HT copolycarbonate from Miles, Inc. The approximate diol component structure of APEC HT, as determined by nuclear magnetic resonance spectroscopy (NMR), is 68 mol percent bisphenol A units and 32 mol percent 3,3,5-trimethylcyclohexane bisphenol units.

For the polycarbonates of the invention, suitable carbonate sources for the carbonate units are preferably phosgene, dialkyl carbonate, such as preferably dibutyl carbonate; or diaryl carbonate, such as preferably diphenyl carbonate.

Up to 10 mol percent of the diol component of the polycarbonate portion can be substituted with units of other modifying aromatic diols, besides bisphenol A and formula (I) diphenol, having from 2 to 16 carbons. It is preferable to have no more than 5 mol percent of other modifying polycarbonate present in the polycarbonate portion of the blend, more preferably 0 mol percent. The modifying polycarbonates are preferably polycarbonates of aromatic diols. Suitable examples of other modifying diols include the aromatic diols of U.S. Pat. Nos. 3,030,335 and 3,317,466.

The inherent viscosity of the polycarbonate portion of the blends according to the present invention is preferably at least about 0.3 dL/g, more preferably at least 0.5 dL/g, determined at 25° C. in 60/40 wt/wt phenol/tetrachloroethane.

"Polyester," as used herein, refers to any unit-type of polyester falling within the scope of the polyester portion of the present blend, including but not limited to homopolyesters, copolyesters, and terpolyesters. The polyester portion of the blend of the present invention comprises a dicarboxylic acid component of about 80 to 100 mol percent 1,4-cyclohexanedicarboxylic acid units, and 0 to about 20 mol percent modifying dicarboxylic acid units, and a glycol component of about 10 to 75 mol percent 2,2,4,4-tetramethyl-1,3-cyclobutanediol units, about 25 to 90 mol percent 1,4-cyclohexanedimethanol units, and 0 to about 10 mol percent modifying glycol units, wherein the total dicarboxylic acid units is equal to 100 mol percent, the total glycol units is equal to 100 mol percent, with a total polyester units equal to 200 mol percent.

The 1,4-cyclohexanedicarboxylic acid used to prepare the polyester can be trans, cis, or mixtures thereof. The 1,4-cyclohexanedicarboxylic acid units are preferably about 50 to 100 mol percent trans, where the total of cis and trans isomer content is equal to 100 mol percent, more preferably the isomer content is greater than about 90 mol percent trans isomer. Substantially trans isomer content is preferred because it is much more economical to obtain and provides more impact strength to the polymer.

In addition to 1,4-cyclohexanedicarboxylic acid units the dicarboxylic acid component of the polyester can be substituted with up to 20 mol percent, but preferably less than 10 mol percent of other modifying dicarboxylic acids having 2 to 20 carbon atoms. Suitable examples of modifying aromatic dicarboxylic acids include terephthalic acid, isophthalic acid, 4,4'-biphenyldicarboxylic acid, 1,4-, 1,5-, 2,6-, 2,7-naphthalenedicarboxylic acid, 4,4'-oxybenzoic, trans-4,4'-stilbenedicarboxylic acid, or mixtures thereof. Suitable examples of modifying aliphatic dicarboxylic acids are those containing 2 to 12 carbon atoms, such as oxalic, malonic, succinic, glutaric, adipic, pimelic, suberic, azelaic, and sebacic acids, or mixtures thereof.

The dicarboxylic acid component of the polyester portion of the present blend can be prepared from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like.

The glycol component of the polyester portion of the present blend is formed from about 10 to 75 mol percent of 2,2,4,4-tetramethyl-1,3-cyclobutanediol units and about 25 to 90 mol percent 1,4-cyclohexanedimethanol units, and up to 10 mole percent modifying glycol units containing 2 to 16 carbons. About 20 to 70 mol percent 2,2,4,4-tetramethyl-1,3-cyclobutanediol units and about 30 to 80 mol percent 1,4-cyclohexanedimethanol units preferably form the polyester glycol component, with about 30 to 50 mol percent 2,2,4,4-tetramethyl-1,3-cyclobutanediol units and about 50 to 70 mol percent 1,4-cyclohexanedimethanol units being most preferred.

The 2,2,4,4-tetramethyl-1,3-cyclobutanediol units and the 1,4-cyclohexanedimethanol units can be cis, trans, or a mixture thereof. The 2,2,4,4-tetramethyl-1,3-cyclobutanediol units are preferably 45–55 mol percent trans, where the total of cis and trans isomer content is equal to 100 mol percent, more preferably the isomer content is about 50/50 trans/cis. The 1,4-cyclohexanedimethanol units are preferably about 50 to 80 mol percent trans, where the total of cis and trans isomer content is equal to 100 mol percent, more preferably about 70/30 trans/cis.

The glycol component of the polyester portion of the present blend contains 0 to about 10 mol percent, but preferably less than 5 mol percent of other modifying glycol units containing 2 to 16 carbon atoms. Examples of suitable modifying glycols include ethylene glycol, 1,2-propanediol, 1,3-propanediol, neopentyl glycol, 1,4-butanediol, 1,5-pentanediol, 1,6-hexanediol, p-xylene glycol, and mixtures thereof. The glycol component can also be modified with 0 to about 10 mol percent polyethylene glycol or polytetramethylene glycols to enhance elastomeric behavior.

The preferred polyester is formed from 1,4-cyclohexanedicarboxylic acid units having at least 50 mol percent trans isomer content, 20 to 60 mol percent 2,2,4,4-tetramethyl-1,3-cyclobutanediol units, and 40 to 80 mol percent 1,4-cyclohexanedimethanol units with no other modifying glycols.

The blends of the present invention are about 1 to 99 weight percent polyester portion and about 1 to 99 weight percent polycarbonate portion, with the total weight percent of the polycarbonate portion and polyester portion preferably being equal to 100 weight percent. The preferred blend of the present invention is about 20 to 99 weight percent polycarbonate and about 1 to 80 weight percent polyester, more preferably about 40 to 99 weight percent polycarbonate and about 1 to 60 weight percent polyester, with a weight percent of about 45 to 55 for both polycarbonate and polyester being most preferred.

Greater concentrations of the copolycarbonate of the blend nearer 99 weight percent produce blends having greater impact strength, heat resistance, and dimensional stability, while blends nearer 99 weight percent polyester have better chemical resistance and melt processability. The most useful blends will be those clear blends having a combination of physical properties best suited for a particular end use, as will be determined on a case by case basis.

The inherent viscosity of the polyester portion of the blends according to the present invention is preferably at least 0.3 dL/g, more preferably at least 0.6 dL/g, determined at 25° C. in 60/40 wt/wt phenol/tetrachloroethane.

The blend compositions of the present invention are clear. The term "clear" is defined herein as an absence of cloudiness, haziness, and muddiness, when inspected visually. The blends of the present invention also exhibit a single glass transition temperature (Tg), a s determined by differential scanning calorimetry DSC).

The chemical resistance and melt processability of the blends of the present invention are good. It is generally known that blending with a polyester improves the chemical resistance and melt processability of polycarbonates. See U.S. Pat. Nos. 4,188,314 and 4,267,096.

The polycarbonate portion of the present blend can be prepared in the melt, in solution, or by interfacial polymerization techniques well known in the art. Suitable methods include the steps of reacting a carbonate source with a diol or diols at a temperature of about 0° C. to 315° C. at a pressure of about 0.1 to 760 mm Hg for a time sufficient to form a polycarbonate. Commercially available polycarbonates that are typically used in the present invention are normally made by reacting an aromatic diol with a carbonate source such as phosgene, dibutyl carbonate or diphenyl carbonate, to incorporate 100 mol percent of carbonate units, along with 100 mol percent diol units into the polycarbonate. For examples of methods of producing polycarbonates, see U.S. Pat. Nos. 5,498,688, 5,494,992, and 5,489,665 which are incorporated by this reference in their entireties for all of their teachings.

The polyester portion of the present invention can be made by processes known from the literature such as, for example, by processes in homogeneous solution, by transesterification processes in the melt and by two phase interfacial processes. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters.

The polyester/polycarbonate blends of the present invention can be made by methods which include the steps of blending the polycarbonate and polyester portions of the present invention at a temperature of about 25° C. to 350° C. for a time sufficient to form a clear blend composition. Suitable conventional blending techniques include the melt method and the solution-prepared method. Other suitable blending techniques include dry blending and/or extrusion.

The melt blending method includes blending the polymers at a temperature sufficient to melt the polycarbonate and polyester portions, and thereafter cooling the blend to a temperature sufficient to produce a clear blend. The term "melt" as used herein includes, but is not limited to, merely softening the polymers. For melt mixing methods generally known in the polymers art, see Mixing and Compounding of Polymers (I. Manas-Zloczower & Z. Tadmor eds., Carl Hanser Verlag publisher, New York 1994).

The solution-prepared method includes dissolving the appropriate weight/weight ratio of polyester and polycarbonate in a suitable organic solvent such as methylene chloride or a 70/30 mixture of methylene chloride and hexafluoroisopropanol, mixing the solution, and separating the blend composition from solution by precipitation of the blend or by evaporation of the solvent. Solution-prepared blending methods are generally known in the polymers art.

The melt blending method is the preferred method for producing the blend compositions of the present invention. The melt method is more economical and safer than the solution-prepared method which requires the use of volatile solvents. The melt method is also much more effective in providing clear blends. Any of the clear blends of the present invention that can be prepared by solution blending can also be prepared by the melt method. However, some of the blends of the present invention can be prepared by the melt method, but not by the solution method. Any blending process which provides clear blends of the present invention is suitable. One of ordinary skill in the art will be able to determine appropriate blending methods for producing the clear blends of the present invention.

In addition to the polycarbonate and polyester portions disclosed above, the blend of the present invention can include at least one other modifying polymer. Suitable modifying polymers are those which form miscible blends with the polycarbonate and polyester portions disclosed above. Possible modifying polymers include other polycarbonates, other polyesters, polyamides, polystyrenes, polyurethanes, polyarylates, liquid crystalline polymers, vinyl polymers, and the like, or a mixture thereof. Suitable modifying polymers may be determined by one of ordinary skill in the polymers art by performing traditional miscibility tests with possible modifying polymers.

A polymer may be determined to be a suitable modifying polymer of the blend of the present invention if a clear blend is formed by: 1) blending the modifying polymer with a pre-existing blend containing the polycarbonate and polyester portions, or 2) blending the modifying polymer with the polycarbonate portion prior to the introduction of the polyester portion, or 3) blending the modifying polymer with the polyester portion prior to the introduction of the polycarbonate portion, or 4) mixing the modifying polymer, polycarbonate portion and polyester portion all together prior to blending.

The clear blends of the present invention can still be further modified by the incorporation of blend modifiers to produce performance blends which may not necessarily be clear. For example, polyamides such as nylon 6,6 from DuPont, poly(ether-imides) such as ULTEM poly(ether-imide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(ester-carbonates) such as LEXAN 3250 poly(ester-carbonate) (General Electric), polycarbonates other than LEXAN polycarbonate from General Electric, polyarylates such as ARDEL D100 polyarylate (Amoco), polysulfones, polysulfone ethers, poly (ether-ketones) or aromatic dihydroxy compounds can be used as blend modifiers to modify properties or to reduce flammability. The aromatic dihydroxy compounds used to prepare these polymers are disclosed in U.S. Pat. No. 3,030,335 and U.S. Pat. No. 3,317,466.

The blends of the present invention can also contain antioxidants, conventional flame retardants such as phosphorus or halogen compounds, or fillers such as talc or mica, or reinforcing agents such as glass fiber, KEVLAR, or carbon fiber. Additives such as pigments, dyes, stabilizers, plasticizers, etc. can also be used in the polyesters, polycarbonates, and blends of the present invention to further modify the properties of the inventive blends.

The blends of the present invention are useful in producing clear articles of manufacture having improved chemical resistance and melt processability while retaining excellent mechanical properties. These blends are especially useful for making molded articles, fibers, films, and sheeting.

The following examples are intended to illustrate the present invention but are not intended to limit the reasonable scope thereof.

EXAMPLES

The inherent viscosity of the polyesters was determined in 60/40 (wt/wt) phenol/tetrachloroethane at a concentration of 0.5 g/100 mL at 25° C. The glass transition temperatures (Tg's) were determined using a DuPont 912 DSC (differential scanning calorimeter) at a scan rate of 20° C./min. The glycol content of the polyester portion of these blends was determined by proton nuclear magnetic resonance spectroscopy (NMR). Clarity was determined visually. The miscibility of the blends was determined by differential scanning calorimetry and by observation of the clarity of polymer/polymer melts or pressed films.

The blends of this invention were prepared in two ways:

1) The solution-prepared method of dissolving the appropriate weight/weight ratio of polyester to polycarbonate in methylene chloride or a mixture of methylene chloride/hexafluoroisopropanol and after complete solution was obtained, precipitating the blend with methanol.

2) The melt mixing method of dry blending the appropriate weight/weight ratio of polyester to polycarbonate and extruding the blend on a 3/4-in Brabender extruder equipped with a screen pack and mixing screw at temperatures of 260–320° C.

The preparation of polycarbonates is well known in the art. The polycarbonate used in the following examples was APEC HT copolycarbonate from Miles, Inc. The bisphenol A polycarbonate used was MAKROLON 2608, available from Miles, Inc.

The following examples illustrate the preparation of some of the polyesters used in this invention and their miscibility with APEC HT polycarbonate.

Example 1

Examples 1A–1K illustrate the miscibility of 50/50 wt/wt solution-prepared blends of APEC HT copolycarbonate and a copolyester containing 100 mol percent 1,4-cyclohexanedicarboxylic acid units and varying amounts of 2,2,4,4-tetramethyl-1,3-cyclobutanediol units and 1,4-cyclohexanedimethanol units. Examples 1A–1K were all prepared in a similar manner. The specific preparation of the polyester and blend for Example 1G and Example 1K (Control) are shown below. The results are presented in Table 1.

Example 1G illustrates the preparation of a clear blend obtained from blending APEC HT copolycarbonate with a copolyester prepared from 100 mol percent dimethyl trans-1,4-cyclohexanedicarboxylate, 60 mol percent 2,2,4,4-tetramethyl-1,3-cyclobutanediol (50/50 trans/cis), and 40 mol percent 1,4-cyclohexanedimethanol (70/30 trans/cis).

To prepare the copolyester for Example 1G, a mixture of 120.0 g (0.60 mol) dimethyl trans-1,4-cyclohexanedicarboxylate, 47.3 g (0.22 mol) 1,4-cyclohexanedimethanol (70/30 trans/cis) (67% in methanol), 56.2 g (0.39 mol) 2,2,4,4-tetramethyl-1,3-cyclobutanediol (50/50 trans/cis), 0.168 g IRGANOX 1010 (an antioxidant by Ciba-Geigy), 0.10 g titanium tetraisopropoxide (100 ppm Ti), and 0.14 g dibutyltin oxide (400 ppm Sn) was placed in a 1-L flask equipped with an inlet for argon, a metal stirrer, and a short distillation column. The flask was placed in a Belmont metal bath already heated to 220° C. and the contents of the flask were heated at 220° C. for 6 hours. The temperature was raised to 250° C. After the temperature reached 250° C., a vacuum of 0.5 mm mercury was gradually applied over the next 3–5 minutes. Full vacuum was maintained for a total time of about 3 hours. A high melt viscosity, light yellow polymer was obtained with a glass transition temperature of 99° C. and an inherent viscosity of 0.65 dL/g.

The polyester was then ground to pass a 3-mm screen and 0.25 g of the polyester was dissolved in methylene chloride with 0.25 g APEC HT copolycarbonate. After solution was complete, the polymers were precipitated by dropping the blend solution into methanol. The precipitate which formed was collected, dried in a vacuum oven for 72 hours at 50° C., and determined to have a single glass transition temperature.

The blend was thereafter melted and pressed into a thin film. The film appeared visually clear.

Example 1K (Control) illustrates the preparation of the 1,4-cyclohexanedicarboxylic/2,2,4,4-tetramethyl-1,3-cyclobutanediol homopolyester and the preparation of a 50/50 weight percent APEC HT copolyester blend.

To prepare the homopolyester for Example 1K, a mixture of 100.0 g (0.500 mol) dimethyl 1,4-cyclohexanedicarboxylate, 75.6 g (0.525 mol) 2,2,4,4-tetramethyl-1,3-cyclobutanediol (50/50 trans/cis), 0.10 g titanium tetraisopropoxide (125 ppm Ti), 0.15 g dibutyltin oxide (500 ppm Sn), and 0.125 g IRGANOX 1010 was placed in a 1-L flask equipped with an inlet for argon, a metal stirrer, and a short distillation column. The flask was placed in a Belmont metal bath already heated to 220° C. The contents of the flask were heated at 220° C. for 5.5 hours. The temperature was raised to 250° C. After the temperature reached 250° C., a vacuum of 0.5 mm was gradually applied over the next 3–5 minutes. Full vacuum was maintained for 1 hour at 250° C. and 1 hour at 260° C. A high melt viscosity, clear polymer was obtained with a glass transition temperature of 121° C. and an inherent viscosity of 0.37 dL/g.

The polyester was ground to pass a 3-mm screen and 0.25 g of the polyester was dissolved in methylene chloride-with 0.25 g APEC HT copolycarbonate. After solution was complete, the polymers were precipitated by dropping the blend solution into methanol. The precipitate was collected, dried in a vacuum oven for 72 hours at 50° C., and determined to have two glass transition temperatures. The blend was melted and pressed into a thin film. The film appeared opaque.

It can be seen from Table 1 that Examples 1B–1H, the blends containing between 10 to 70 mol percent 2,2,4,4-tetramethyl-1,3-cyclobutanediol units, with the remaining glycol units being 1,4-cyclohexanedimethanol units, were unexpectedly clear, even when using the less preferred solution blending method.

TABLE 1

Solution Prepared Blends of Polyesters of 1,4-Cyclohexanedicarboxylic acid 2,2,4,4-Tetramethyl-1,3-cyclobutanediol, and 1,4-Cyclohexanedimethanol with APEC HT Copolycarbonate
Blend Composition: 50 wt. % Polycarbonate/50 wt. % Polyester

| Example | Polyester Composition | | Blend Visual Clarity | DSC Number of Tgs |
|---|---|---|---|---|
| | CHDM, Mol % | TMCD, Mol % | | |
| 1A | 100 | 0 | Cloudy | Two |
| 1B | 90 | 10 | Clear | — |
| 1C | 80 | 20 | Clear | — |
| 1D | 70 | 30 | Clear | One |
| 1E | 60 | 40 | Clear | One |
| 1F | 50 | 50 | Clear | One |
| 1G | 40 | 60 | Clear | One |
| 1H | 30 | 70 | Clear | One |
| 1I | 20 | 80 | Cloudy | Two |
| 1J | 10 | 90 | Cloudy | Two |
| 1K | 0 | 100 | Opaque | Two |

1,4-cyclohexanedicarboxylic acid (99/1 trans/cis)
TMCD = 2,2,4,4-tetramethyl-1,3-cyclobutanediol (50/50 trans/cis),
CHDM = 1,4-cyclohexane dimethanol (70/30 trans/cis).

Example 2

The blends in this example were prepared by the same solvent blending method used in Example 1. However, the polycarbonate used was a bisphenol A polycarbonate, MAKROLON 2608. The results are presented in Table 2. Examples 2C through 2G show results from the same polyesters as were used in Examples 1C through 1G, respectively. However, the films which were prepared from blends with APEC HT copolyester in Examples 1C through 1G were clear, while the films which were prepared from blends with bisphenol A polycarbonate in Examples 2C through 2G were cloudy or opaque.

These results demonstrate the importance of the polycarbonate structure in achieving visually clear films.

TABLE 2

Solution Prepared Blends of Polyesters of 1,4-Cyclohexanedicarboxylic acid, 2,2,4,4-Tetramethyl-1,3-cyclobutanediol, and 1,4-Cyclohexanedimethanol with Bisphenol A Polycarbonate
Blend Composition: 50 wt. % Polycarbonate/50 wt. % Polyester

| Example | CHDM, mol % | TMCD, mol % | Clarity | Number of Tg's |
|---|---|---|---|---|
| 2A | 100 | 0 | Clear | One |
| 2B | 90 | 10 | Clear | One |
| 2C | 80 | 20 | Cloudy | — |
| 2D | 70 | 30 | Cloudy | — |

TABLE 2-continued

Solution Prepared Blends of Polyesters of 1,4-Cyclohexanedicarboxylic acid, 2,2,4,4-Tetramethyl-1,3-cyclobutanediol, and 1,4-Cyclohexanedimethanol with Bisphenol A Polycarbonate
Blend Composition: 50 wt. % Polycarbonate/50 wt. % Polyester

| Example | CHDM, mol % | TMCD, mol % | Clarity | Number of Tg's |
|---|---|---|---|---|
| 2E | 60 | 40 | Opaque | Two |
| 2F | 50 | 50 | Opaque | Two |
| 2G | 40 | 60 | Opaque | Two |
| 2H | 30 | 70 | — | — |
| 2I | 20 | 80 | Opaque | Two |
| 2J | 10 | 90 | Opaque | Two |
| 2K | 0 | 100 | Opaque | Two |

1,4-cyclohexanedicarboxylic acid (99/1 trans/cis)
TMCD = 2,2,4,4-tetramethyl-1,3-cyclobutanediol (50/50 trans/cis),
CHDM = 1,4-cyclohexane dimethanol (70/30 trans/cis).

Example 3

The blends of this example were prepared by melt mixing. Blends of APEC HT copolycarbonate with homopolyesters were prepared by an extruder in the melt. The blend compositions were 50 weight percent polycarbonate and 50 weight percent polyester. The pellets Were first mixed by tumbling. The blends were prepared in a 3/4-in Brabender single screw extruder with a mixing screw. Injection molded parts were prepared on a Boy 22S injection molding machine. Processing temperatures used were in the range of 280° C. to 315° C. Visual inspection was used to determine clarity.

Example 3A was a blend of 50 weight percent APEC HT copolycarbonate and 50 weight percent homopolyester of 1,4-cyclohexanedicarboxylic acid (99/1 trans/cis) and 1,4-cyclohexanedimethanol (70/30 trans/cis). Example 3A exhibited unexpected visual clarity. Note that the clear blend of Example 3A (melt blended) had the same composition as the cloudy, solution blended Example 1A. This difference is believed to be due to the more intensive mixing which is achieved in the melt.

Example 3B was a blend of 50 weight percent APEC HT copolycarbonate and 50 weight percent homopolyester of 1,4-cyclohexanedicarboxylic acid (99/1 trans/cis) and 2,2,4,4-tetramethyl-1,3-cyclobutanediol (50/50 trans/cis). Example 3B was opaque and is not part of the present invention.

This example illustrates that the melt method is the preferred method of making the blends of the present invention and that while the blends of the present invention may be cloudy or opaque when prepared by solution methods, they are clear when prepared by melt mixing. Also see the comparison in melt mixing and solution blending in the copending application for docket 68379, incorporated herein.

Selected mechanical properties of the blend of Example 3A prepared in the melt were analyzed. Example 3A exhibited a useful combination of clarity, high heat deflection temperature, and impact strength. The heat deflection temperature was 95° C. at 66 psi loading, and 85° C. at 264 psi loading, as determined according to ASTM D648. The Notched Izod Impact strength determined at 23° C. according to ASTM D256 was 1.1 ft-lb/inch. The flexural modulus and flexural strength, determined according to ASTM D790, were 278,000 psi and 11,940 psi, respectively.

As will be apparent to anyone skilled in the art, these compositions have broad applications including the fabrication of molded articles, fibers, sheeting, or films, particularly where visual clarity is important.

The invention has been described in detail with particular reference to preferred embodiments thereof, but it will be understood that variations and modification can be effected within the spirit and scope of the invention. Moreover, all patents, patent application (published and unpublished, foreign or domestic), literature references or other publications noted above are incorporated herein by reference for any disclosure pertinent to the practice of this invention.

We claim:

1. A blend composition comprising:
   (A) from 1 to 99 percent by weight of a polycarbonate comprising a diol component comprising from 5 to 100 mol percent units of a diphenol or mixture of diphenols having the formula

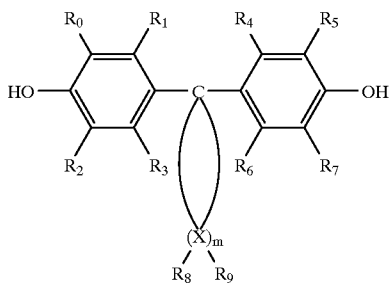

(I)

wherein
   $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl,
   X represents carbon,
   m is an integer of from 4 to 7,
   and $R_8$ and $R_9$ are independently selected for each X and independently selected of each other from the group consisting of hydrogen and $C_1$–$C_8$ alkyl;
   0 to about 95 mol percent 4,4'-isopropylidenediphenol units, and about 0 to about 10 mol percent modifying glycol units having 2 to 16 carbons, wherein the total mol percent of diol units is equal to 100 mol percent; and
   (B) from 1 to 99 percent by weight of a polyester comprising
   (a) a dicarboxylic acid component comprising from 80 to 100 mol percent 1,4-cyclohexane-dicarboxylic acid units; and from 0 to about 20 mol percent modifying dicarboxylic acid units having from 2 to 20 carbons, wherein the total mol percent of dicarboxylic acid units is equal to 100 mol percent; and
   (b) a glycol component comprising from 10 to 75 mol percent 2,2,4,4-tetramethyl-1,3-cyclobutanediol units, from 25 to 90 mol percent 1,4-cyclohexanedimethanol units, and from 0 to 10 mol percent modifying glycol units having 2 to 16 carbons, wherein the total mol percent of glycol units is equal to 100 mol percent;
   wherein the total units of said polyester is equal to 200 mol percent; wherein said blend is clear and the total weight percent of said polycarbonate (A) and said polyester (B) is equal to 100 weight percent.

2. The composition of claim 1 wherein said polycarbonate (A) is present at from 40 to 99 weight percent, based on the weight of the blend composition, and said polyester (B) is present at from 1 to 60 weight percent, based on the weight of the blend composition.

3. The composition of claim 1, wherein said polycarbonate (A) is present at from 45 to 55 weight percent, based on the weight of the blend composition, and said polyester is present at from 45 to 55 weight percent, based on the weight of the blend composition.

4. The composition of claim 1 wherein said diol component of said polycarbonate contains from 10 to 90 mol percent diphenol (I) units and from 10 to 90 mol percent 4,4'-isopropylidenediphenol units.

5. The composition of claim 4 wherein said diol component contains from 20 to 50 mol percent diphenol (I) units and from 50 to 80 mol percent 4,4'-isopropylidenediphenol units.

6. The composition of claim 4 wherein said diol component contains from 30 to 35 mol percent diphenol (I) units and from 65 to 70 mol percent 4,4'-isopropylidenediphenol units.

7. The composition of claim 1 wherein said dicarboxylic acid component of said polyester portion contains 100 mol percent 1,4-cyclohexanedicarboxylic acid units.

8. The composition of claim 1 wherein said 1,4-cyclohexanedicarboxylic acid units are from 50 to 100 mol percent trans, wherein the total of cis and trans isomer content is equal to 100 mol percent.

9. The composition of claim 8, wherein the 1,4-cyclohexanedicarboxylic acid units are 90 mol percent trans.

10. The composition of claim 1 wherein said glycol component of said polyester consists essentially of 2,2,4,4-tetramethyl-1,3-cyclobutanediol units and 1,4-cyclohexanedimethanol units.

11. The composition of claim 1, wherein the 2,2,4,4-tetramethyl-1,3-cyclobutanediol consists of 50 percent cis isomers and 50 percent trans isomer, where the total of the cis and trans isomer is equal to 100 mol percent.

12. The composition of claim 1 wherein said glycol component of said polyester is from 20 to 70 mol percent 2,2,4,4-tetramethyl-1,3-cyclobutanediol units and from 30 to 80 mol percent 1,4-cyclohexanedimethanol units.

13. The composition of claim 11 wherein said glycol component of said polyester is from 30 to 50 mol percent 2,2,4,4-tetramethyl-1,3-cyclobutanediol units and from 50 to 70 mol percent 1,4-cyclohexanedimethanol units.

14. The composition of claim 1 wherein said modifying dicarboxylic acid units of said polyester are selected from the group consisting of terephthalic acid, isophthalic acid, 4,4'-biphenyldicarboxylic acid; 1,4-, 1,5-, 2,6-, 2,7-naphthalenedicarboxylic acid; 4,4'-oxydibenzoic acid; trans-4,4'-stilbenedicarboxylic acid; oxalic acid; malonic acid; succinic acid; glutaric acid; adipic acid; pimelic acid; suberic acid; azelaic acid; sebacic acid; and mixtures thereof.

15. The composition of claim 1 wherein said modifying glycol units of said polyester are selected from the group consisting of ethylene glycol, 1,2-propanediol, 1,3-propanediol, neopentyl glycol, 1,4-butanediol, 1,5-pentanediol, 1,6-hexanediol, p-xylene glycol, and mixtures thereof.

16. The composition of claim 1, wherein the polyester consists essentially of cyclohexanedicarboxylic acid units having at least 50 mol percent trans isomer content, from 20 to 60 mol percent 2,2,4,4-tetramethyl-1,3-cyclobutanediol units, and from 40 to 80 mol percent 1,4-cyclohexanedimethanol units.

17. The composition of claim 1 wherein said diphenol of formula (I) is a cyclohexyl diphenol having the formula

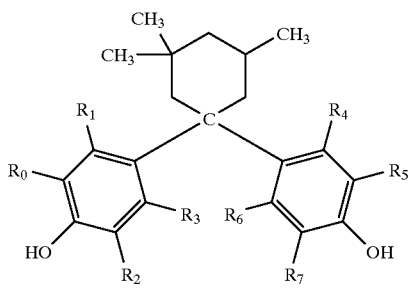

(II)

wherein $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl.

18. The composition of claim 17 wherein said cyclohexyl diphenol is 3,3,5-trimethylcyclohexane bisphenol.

19. The composition of claim 1 wherein said blend composition has a single glass transition temperature.

20. The composition of claim 1 wherein said polycarbonate has an inherent viscosity of at least 0.3 dL/g at 25° C. and said polyester has an inherent viscosity of at least 0.3 dL/g at 25° C.

21. A clear article of manufacture made from the composition according to claim 1, selected from the group consisting of molded articles, fibers, films, and sheeting.

22. A clear article of manufacture made from the composition according to claim 1.

23. A method of using the blend of claim 1 to produce a clear article of manufacture comprising:
  (a) blending polycarbonate (A) and polyester (B) of claim 1;
  (b) before, during or after the blending, melting polycarbonate (A) and polyester (B) to form, after the blending and melting, a melt blend;
  (c) then cooling the melt blend to form a clear blend composition.

* * * * *